United States Patent
Thompson et al.

(10) Patent No.: US 6,334,133 B1
(45) Date of Patent: *Dec. 25, 2001

(54) SYSTEM AND METHOD FOR PERFORMING SUBSTITUTE FULFILLMENT

(75) Inventors: Roland R. Thompson, Malvern; Michael S. Blackstone, Downingtown, both of PA (US)

(73) Assignee: FrontLine Data, Inc., Malvern, PA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/217,116

(22) Filed: Dec. 21, 1998

(51) Int. Cl.[7] .................................................. G06F 17/00
(52) U.S. Cl. ................................................ 707/104; 705/9
(58) Field of Search .......................... 705/7–11; 707/1, 707/10, 100, 103, 104

(56) References Cited

U.S. PATENT DOCUMENTS

| | | | |
|---|---|---|---|
| 5,164,897 | * 11/1992 | Clark et al. | 705/1 |
| 5,325,292 | * 6/1994 | Crockett | 705/9 |
| 5,548,506 | * 8/1996 | Srinivasan | 705/8 |
| 5,634,055 | * 5/1997 | Barnewall et al. | 707/103 |
| 5,884,270 | * 3/1999 | Walker et al. | 705/1 |
| 5,911,134 | * 6/1999 | Castonguay et al. | 705/9 |
| 5,913,029 | * 6/1999 | Shostak | 345/357 |
| 5,913,201 | * 6/1999 | Kocur | 705/9 |
| 5,918,207 | * 6/1999 | McGovern et al. | 705/1 |
| 5,974,392 | * 10/1999 | Endo | 705/8 |
| 6,044,354 | * 3/2000 | Asplen, Jr. | 705/7 |
| 6,044,355 | * 3/2000 | Crockett et al. | 705/8 |
| 6,049,776 | * 4/2000 | Donnelly et al. | |
| 6,058,423 | * 5/2000 | Factor | 709/226 |

OTHER PUBLICATIONS

Thomas L. Dean, "Decision Support for Coordinated Multi-Agent Planning", ACM 1986, pp. 81–91.*

* cited by examiner

Primary Examiner—Thomas Black
Assistant Examiner—Uyen Le
(74) Attorney, Agent, or Firm—Kilpatrick Stockton LLP

(57) ABSTRACT

A system and method for automating the performance of substitute fulfillment to assign a replacement worker to substitute for a worker during a temporary absence. Using a database of substitute fulfillment data, the system handles key functions of performing substitute fulfillment. Substitute fulfillment data is stored centrally in a database on a server at a common site for multiple organizations employing the substitute fulfillment system. The database includes worker data records and substitute data records. When an worker absence is indicated, the system searches the database to obtain a list of potential replacements for the absent worker. The system contacts potential replacements until one is found or until the list is exhausted. The system generates suitable reports and notifies organization personnel of any activity. The system relies on multiple communications channels to interact with client organizations, workers, and substitutes. The system may maintain data and perform substitute fulfillment across multiple organizations. The system stores and aggregates historical system operation data, and prepares reports and provides services using the historical data.

11 Claims, 8 Drawing Sheets

| STAFF | |
|---|---|
| Name | 92 |
| Title | 94 |
| Social Security Number | 96 |
| Pin | 98 |
| Cross reference to billing contact | 100 |
| Certification(s) | 102 |
| Substitute preferences | 104 |
| Schedule manipulation | 106 |
| Absence record | 108 |
| School reference | 110 |
| District reference | 112 |
| County reference | 114 |
| E-mail address | 116 |
| Fax number | 118 |
| Room/Office number | 120 |
| Special flag for recorded messages | 122 |
| Entitlement balances | 124 |
| Availability | 126 |
| Call time preferences | 128 |

| Pick-Lists | |
|---|---|
| Field preferences<br>Required<br>Visible<br>Default data | 152 |
| Field data<br>Type | 154 |
| Certification | 156 |
| Entitlement types | 158 |
| People | 160 |
| Schools | 162 |
| District | 164 |

| Business Data | |
|---|---|
| Billing address | 132 |
| Mailing address | 134 |
| Billing contact | 136 |
| Emergency contact<br>Evening<br>Weekend<br>Business | 138 |
| Phone number | 140 |
| Fax number | 142 |
| E-mail | 144 |
| PO # | 146 |
| Options turned on | 148 |

| School Data | |
|---|---|
| Name | 168 |
| Code | 170 |
| Type | 172 |
| Principal | 174 |
| Fax | 176 |
| Assign fax list | 178 |
| Phone | 180 |
| Secretary | 182 |
| Assign substitute | 184 |
| Assign staff | 186 |
| Record/Play | 188 |

| County Data |
|---|
| Name |
| Code |
| State |
| Associate districts |
| Assign substitutes |

190 → table; 192, 194, 196, 198, 200

FIG. 7

| District Data |
|---|
| Name |
| Code |
| District address |
| Phone |
| Fax |
| Assign fax list |
| Administrator/Board secretary |
| Associate schools |
| Assign substitutes |
| Assign staff |
| Record/Play |

202 → table; 204, 206, 208, 210, 212, 214, 216, 218, 220, 222, 224

FIG. 8

| Preferences |
|---|
| Options<br>Calling numbers<br>Select internet/intranet calling profiles<br>Password<br>Key value |

226 → table; 228

FIG. 9

| Reports | |
|---|---|
| Acceptance/refusal history | 232 |
| Call History | 234 |
| Unfulfilled | 236 |
| Teacher manifest<br>Trend analysis | 237 |
| Substitute manifest | 238 |
| School manifest | 240 |
| Substitute performance<br>Acceptance rating<br>Flexibility rating<br>Trend analysis | 242 |
| Staff attendance | 244 |
| Staff calendars | 246 |
| Assignment reports<br>School<br>District<br>County | 248 |

| Wizard | |
|---|---|
| Phone | 252 |
| Emergency phone | 254 |
| Contact | 256 |
| Billing address | 258 |
| District | 260 |
| Title | 262 |
| Number of teachers (approx.) | 264 |
| Number of support staff (approx.) | 266 |
| Fax number | 268 |
| E-mail address optional | 270 |
| Billing contact optional | 272 |

ABSENTEE REPORT

Date: 1/8/98          Time: 14:40:08

276 — Name      Social Security #    Phone #      Title          Time      Location
Smith, John, T.   005-75-2243      (609)-555-1111   Social Studies   14:39:50   Howard
              Date:             1/8/98
              Type:             Sick
              F/H Day:        Half Day/PM

SUBSTITUTE ASSIGNMENT REPORT

Date: 1/8/98          Time: 17:08

278 — Name: Smith, John, T.      SSN: 005-75-2243
Title: Social Studies gr 8    School ID: 011
Location: Howard          School: 50 South School Street Substitute Information
       Name: Smith, Charles    SSN: 005-76-2214
       Contact Date: 1/8/98      Time: 17:06

CALL HISTORY REPORT

Date: 1/8/98          Time: 17:08

279 — Name: Smith, John, T.    SSN: 005-75-2243
Date:   1/8/98    Time: 17:04    Line: Answer    Status: No Contact    Sub: Smith, Mark, C.
Date:   1/8/98    Time: 17:05    Line: Answer    Status: Rejected      Sub: Jones, Pat, B.
Date:   1/8/98    Time: 17:06    Line: Answer    Status: Accepted     Sub: Smith, Charles D.

UNFULFILLED SUBSTITUTE ASSIGNMENT REPORT

Date: 1/8/98          Time: 19:10

280 — Name: Hitchens, Jack, R.    SSN: 008-73-2278
Title: English gr 11          School ID: 012
Location: Blair              School: 123 South Main Street

*FIG. 12*

SYSTEM AND METHOD FOR PERFORMING SUBSTITUTE FULFILLMENT

FIELD OF THE INVENTION

The present invention generally relates to systems and methods for human resources management. More particularly, the present invention relates to systems and methods for performing substitute fulfillment, including identifying acceptable substitute workers and confirming assignments of substitute workers in an organization. Still more particularly, the present invention relates to systems and methods for shifting the burden of performing substitute fulfillment away from affected organizations, for centralizing substitute fulfillment tasks, and for enhancing the efficacy and reliability of substitute fulfillment procedures.

BACKGROUND OF THE INVENTION

To date, location of a replacement to fill a temporary employee absence in an organization, a process referred to as "substitute fulfillment," has generally been an unreliable, labor-intensive, often panic-driven, process. In any organization, the absence of a worker can have perceptible consequences throughout the workplace. The consequences of an employee absence will vary with the nature of the work environment and with the scope of the employee's position; other relevant factors may include, for example, upcoming deadlines and patterns of absenteeism in the particular organization. Those consequences may be immediate and drastic, as when an assembly line shuts down due to the absence of a critical worker on the line, or more attenuated and moderate, as when another employee is distracted from his primary task to answer telephones due to the absence of the office receptionist. In a typical case, those consequences may include diversion of management resources to address the consequences of the absence; delays in accomplishing projects in which the absentee has a role; displacement of other employees, who must fulfill the absentee's role, either by express assignment or in order to complete their own tasks; reduced productivity; fines levied against the organization, particularly if the absence impacts safety or other government-regulated aspects of the work environment; and, in an extreme but not uncommon case, the inability to complete the central task of the organization.

In the latter case, assignment of a substitute worker is imperative or "mission-critical"—without a substitute worker, the mission of the organization will not go forward—so filling the vacancy with a temporary replacement is the only acceptable alternative; in other cases, assignment of a substitute worker may not be mission-critical, but may nevertheless be a preferred policy in order to minimize the consequences of any absence. As a result, an upcoming absence may impact the workplace even before the absence period begins, as managers consider ways of compensating for the absence. Examples of work environments in which substitute fulfillment may be a mission-critical task include schools, emergency services, and manufacturing plants, particularly plants with an assembly-line operation. The replacement of an absent teacher with a substitute teacher is a commonly occurring example of a mission-critical substitute-fulfillment objective.

Thus, in an organization where a substitute is necessary or desired, when an employee notifies the organization that he will be absent, management must necessarily turn its attention to the substitute fulfillment task, or risk a noticeable reduction in the productivity of the organization or an inability to accomplish the business of the organization for the entire absence period. Although seemingly simple in concept, the substitute fulfillment task is non-trivial, requiring managers to devote significant time, effort and other resources, with no guarantee of success. Substitute fulfillment is complicated by the number of intermediate tasks that must be accomplished and constraints that must be satisfied to successfully realize a particular substitute fulfillment in a timely fashion.

The absent worker may, and usually does, provide notice of his impending absence less than a day, or even only several hours, before he is expected at work. Thus, management often enters the substitute fulfillment task with little time to carry it out; if the process is not automated in any aspect, then management must direct each step of the process. Once the absence, which may extend from only hours to several days, or even months, is known, management must typically identify the scope of the absentee worker's critical responsibilities and skills to establish criteria for identifying a suitable substitute and develop a substitution candidate profile. Typically, multiple substitution candidate profiles may be established, with more demanding requirements for ideal or preferred substitutes, and with less demanding, threshold requirements for merely acceptable substitutes. Once the appropriate qualifications for an acceptable substitute are established, management may consider potential replacements from a prepared list of candidates, or alternatively, management may identify potential candidates by some other means. Candidates may be regular employees of the affected workplace, for example, assembly line workers at a manufacturing plant who work different shifts from the absentee, or, persons from outside the workplace, for example, substitute teachers registered with a school district.

Management must then contact potential replacements, typically by telephone, and determine whether potential replacements are available and willing to work at the desired times in the desired position. Merely reaching potential substitutes may require several attempts. In the best case, management will eventually locate and assign an available substitute to cover the vacancy; in the worst case, management will be unable to find a substitute, despite having expended significant resources on the substitute fulfillment task. The substitute fulfillment task is substantially, but not wholly complete when the available substitute is assigned; typically, management performing the substitute fulfillment must then notify the appropriate persons that a substitute has been confirmed to facilitate inclusion of the substitute in the workplace. Due to the complexity of the substitute fulfillment task and the diversion of resources it entails, many workplaces may forego substitute fulfillment despite its desirability.

Substitute fulfillment is a routine practice in the education system, especially at the primary and secondary school levels. An example of substitute fulfillment for a high school teacher is provided herein as an accessible example and for reference. The substitute fulfillment task usually is triggered in a school when a teacher "calls in sick." Depending on the degree to which substitute fulfillment is automated in the school or district, locating a substitute teacher may require the efforts of a principal or other administrator, as well as several support staff members. Once a teacher has called in sick or otherwise signaled his absence, perhaps the night before or even the morning of the absence, the responsible administrator must disrupt her schedule to focus on the substitute fulfillment task. If she is unable to find a substitute teacher, the operation of the class, the department, and even the whole school may be disrupted. For example, the affected classes may fall behind in their scheduled curricula, an administrator or other teachers may have to neglect their other duties to cover for the absentee, and the school may even be fined by the state for failing to provide an acceptable substitute teacher.

In order to perform the substitute fulfillment, generally, first, the administrator must determine which classes the absent teacher teaches and what skills are required of a replacement. In the education system context, state law may also regulate the minimal qualifications for a substitute teacher, both in general and for the specific type of position that must be filled. Thus, if an absent teacher is a high school science teacher who teaches AP Physics and basic chemistry, a replacement may be required not only to have a college degree but also specifically to have pursued college-level classes in both subjects. The administrator then typically identifies acceptable substitutes from the substitutes registered with the school district. The administrator then telephones potential substitutes to check their availability and willingness to take on the assignment. Sometimes she may have to telephone an individual substitute several times to speak with him and obtain a response. If she locates and confirms a substitute, she may then have to inform the relevant department head or other teachers and to complete paperwork to process the substitute assignment.

At present, computer systems for supporting substitute fulfillment are known in the education field. Individual schools in a school district typically share a single such system installed at the school district level. Typical system equipment includes at least one dedicated computer, combined with specialized telephony equipment, including multiple phone lines, and other equipment. The equipment is expensive and set-up of the substitute fulfillment system may be technically demanding. A school district must invest in equipment adequate to handle its anticipated volume of use. In order to upgrade the system, often all of the equipment must be replaced, at substantial expense and annoyance. Such systems are sold by several vendors under the trade names SubFinder (CRS, Inc.), and Substitute Teacher Management System (TSSI).

In these automated systems, necessary information relating to teachers, substitution criteria, registered substitutes, etc. is entered and maintained in a database through software on the system at the school district level. Individual schools in the district access the system through a dial-up connection with a modem from a computer located at the school. School district personnel must receive absence notification and initiate and oversee the substitute fulfillment procedure with support from the system. Significant involvement by school district personnel and the system vendor may be required, including hardware and software support of the system. Thus, operation of the substitute fulfillment system by the individual schools may be technically demanding and require the presence of trained personnel.

In light of the mission-critical nature of the substitute fulfillment task in the education system, the reliability of the system is a key concern. At present, substitute fulfillment systems are not adequately reliable. Power failures and other catastrophic events may undermine the efficacy of systems operated at the school district level. Because all information is maintained locally at the school district level, system failures may result in partial or total data loss. Backup systems entail additional expense, often not within the budgets of school systems.

Present systems are inherently limited in their capabilities due to equipment limitations, access constraints, and operation requirements; thus, each district typically purchases and installs a system and independently handles its own substitute fulfillment using the purchased system. As a result of the decentralized nature of substitute fulfillment management in present systems, it is virtually impossible for school districts to share information and common substitute fulfillment resources. For the same reason, compilation or aggregation of data relating to substitute fulfillment across school districts is difficult and uncommon. All of the costs, responsibilities, disadvantages, and inconveniences of substitute fulfillment are typically borne exclusively and separately by individual school districts and schools.

Illustrated here with a particular example, these same considerations are generally applicable to any organization. Due to the mission-critical nature of the substitute fulfillment task, it is crucial that any equipment or method relating to substitute fulfillment be reliable and efficient. It is an advantage of the present invention to provide a reliable, efficient system and method of substitute fulfillment. It is a further advantage of the present invention to provide an automated substitute fulfillment system and method that has low overhead and requires little organization involvement or oversight. It is another advantage of the present invention to broaden the scope of system connectivity and to include an interface to the Internet. It is yet another advantage of the present invention to maintain a central database of substitute fulfillment related information and to share substitute fulfillment information across organizations. It is still another advantage of the present invention to provide trend analysis and reporting. An improved method of substitute fulfillment is useful to any organization that anticipates a need to assign replacement workers to fill temporary absences.

SUMMARY OF THE INVENTION

The present invention is directed to an automated system and method for performing substitute fulfillment for an organization that wishes to replace an employee during a temporary absence. Generally, at least one presently preferred embodiment of the present invention contemplates that a substitute fulfillment system includes a main server that manages substitute fulfillment for multiple client organizations. The server maintains substitute fulfillment data and other data centrally in a database for multiple client organizations employing the substitute fulfillment system. Organizations enter substitute fulfillment data locally at the organization and transmit the data to the server. An organization maintains its own parallel database on a local application. The system periodically sends updates to and receives updates from an organization's local database. In one preferred embodiment, an employee registers an absence and triggers the automated substitute fulfillment procedure by contacting the substitute fulfillment system.

In at least one preferred embodiment, the system contacts the organization with the absence information. Once an absence is registered, the substitute fulfillment system uses the database to identify potential substitutes based on preferences or criteria selected by the organization and other information. The system then contacts the identified potential substitutes to inquire regarding their availability. In a preferred embodiment, the system continues to contact potential substitutes until one is found or until the list is exhausted and all potential substitutes have refused the assignment.

If a substitute accepts the assignment, the system relays instructions, key information and messages from the worker to the substitute, if necessary. Whether or not a substitute is successfully assigned, the system contacts the organization and other desired update recipients to report on the result. In at least one preferred embodiment, the system relies on multiple communications channels to ensure reliability.

The system maintains data relating to all transactions and to each substitute fulfillment event. The data maintained by the system may be used for system optimization, substitute fulfillment maximization, and trend analysis. The data maintained by the system may be used for inter-organization analysis and substitute fulfillment. The system may generate additional reports related to specific substitute fulfillment tasks or based on historical data as desired.

Although this discussion focuses on environments in which substitute fulfillment is mission-critical, it is understood that it is substantially applicable to any environment in which substitute fulfillment is merely preferred over other methods or one of several methods utilized in addressing an employee absence, even if not critical. It is also understood that "workplace" or "organization" refers not only to more traditional work environments, but to any work environment amenable to substitute fulfillment, such as an employee unit that works cooperatively together within a larger organization, for example, an emergency services unit.

BRIEF DESCRIPTION OF THE DRAWINGS

The present invention and its presently preferred embodiments will be better understood by way of reference to the detailed disclosure hereinbelow and to the accompanying drawings, wherein:

FIG. 4 is a diagram showing an exemplary data structure of a client record stored in accordance with a preferred embodiment of the present invention.

FIG. 5 is a diagram showing an exemplary data structure of a list of pick-lists generated in accordance with a preferred embodiment of the present invention.

FIG. 6 is a diagram showing an exemplary data structure of a school record stored in accordance with a preferred embodiment of the present invention.

FIG. 7 is a diagram showing an exemplary data structure of a county record stored in accordance with a preferred embodiment of the present invention.

FIG. 8 is a diagram showing an exemplary data structure of a district record stored in accordance with a preferred embodiment of the present invention.

FIG. 9 is a diagram showing an exemplary data structure of a user-preferences record stored in accordance with a preferred embodiment of the present invention.

FIG. 10 is a diagram showing a list of available reports selectable by a user in accordance with a preferred embodiment of the present invention.

FIG. 11 is a diagram showing an exemplary data structure for initial registration with a substitute fulfillment system in accordance with a preferred embodiment of the present.

FIG. 12 is a representation of exemplary reports generated in accordance with a preferred embodiment of the present invention.

DESCRIPTION OF THE PREFERRED EMBODIMENTS

Figure 1:
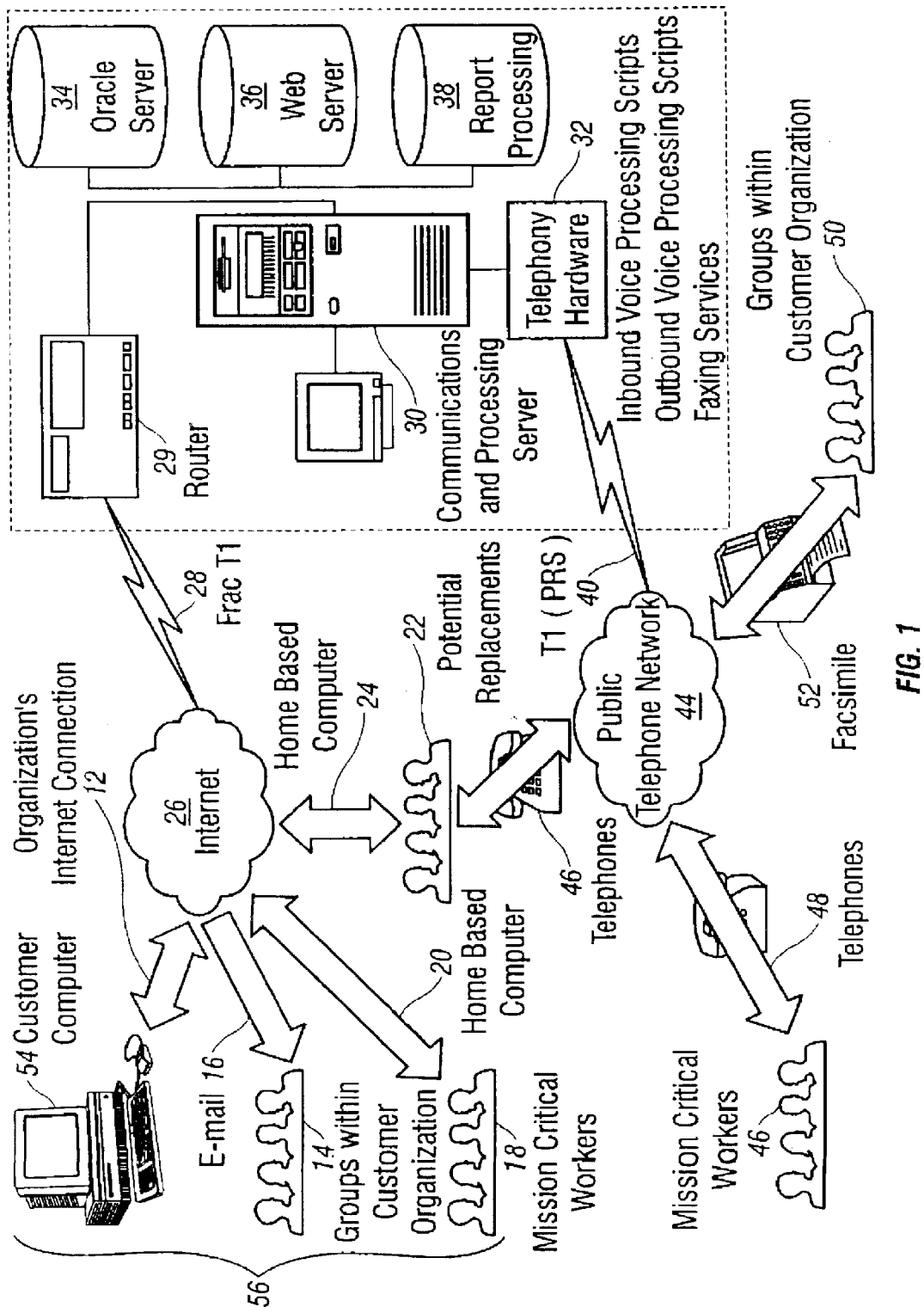
FIG. 1 is a block diagram showing a substitute fulfillment system in accordance with a preferred embodiment of the present invention.

There is generally indicated at 10 in FIG. 1 a block diagram of a substitute fulfillment system in accordance with a preferred embodiment of the present invention. The main components of substitute fulfillment system 10 are a communications and processing server 30, connected to an Oracle™ server, or like database engine 34, a web server 36, and a report processing unit 38, with multiple communication channels for clients, workers and potential replacements. Each unit or server may run on a separate computer or on the same computer as any of the other servers. The communications and processing server 30 manages the substitute fulfillment system 10, including managing communications interfaces and processing substitute fulfillment events. The central communications and processing server 30 also maintains the substitute fulfillment database 34, which contains data files with data records for multiple client organizations. The Oracle™ server maintains and stores the substitute fulfillment database. The Web Server manages and stores web pages accessible from the Internet. The Report Processing Unit generates data for the reporting requirements of the system.

The communications and processing server is connected to telephony hardware 32. Telephony hardware 32 preferably includes multiple phone lines with a connection 40 to a public telephone network 44. In a preferred embodiment, communications and processing server 30 is further connected to a router 29 with a connection 28 to the Internet, shown generally at 26. Preferably, communications and processing server 30 maintains at least two interfaces, most preferably two World Wide Web interfaces, for access to the substitute fulfillment system 10 via the Internet 26. The first such interface or web site is principally directed towards client organizations 56 such as, for example, school districts. The second such interface or web site is principally directed toward workers 18 and potential replacement workers 22, such as, for example, teachers and substitute teachers.

Figure 2:
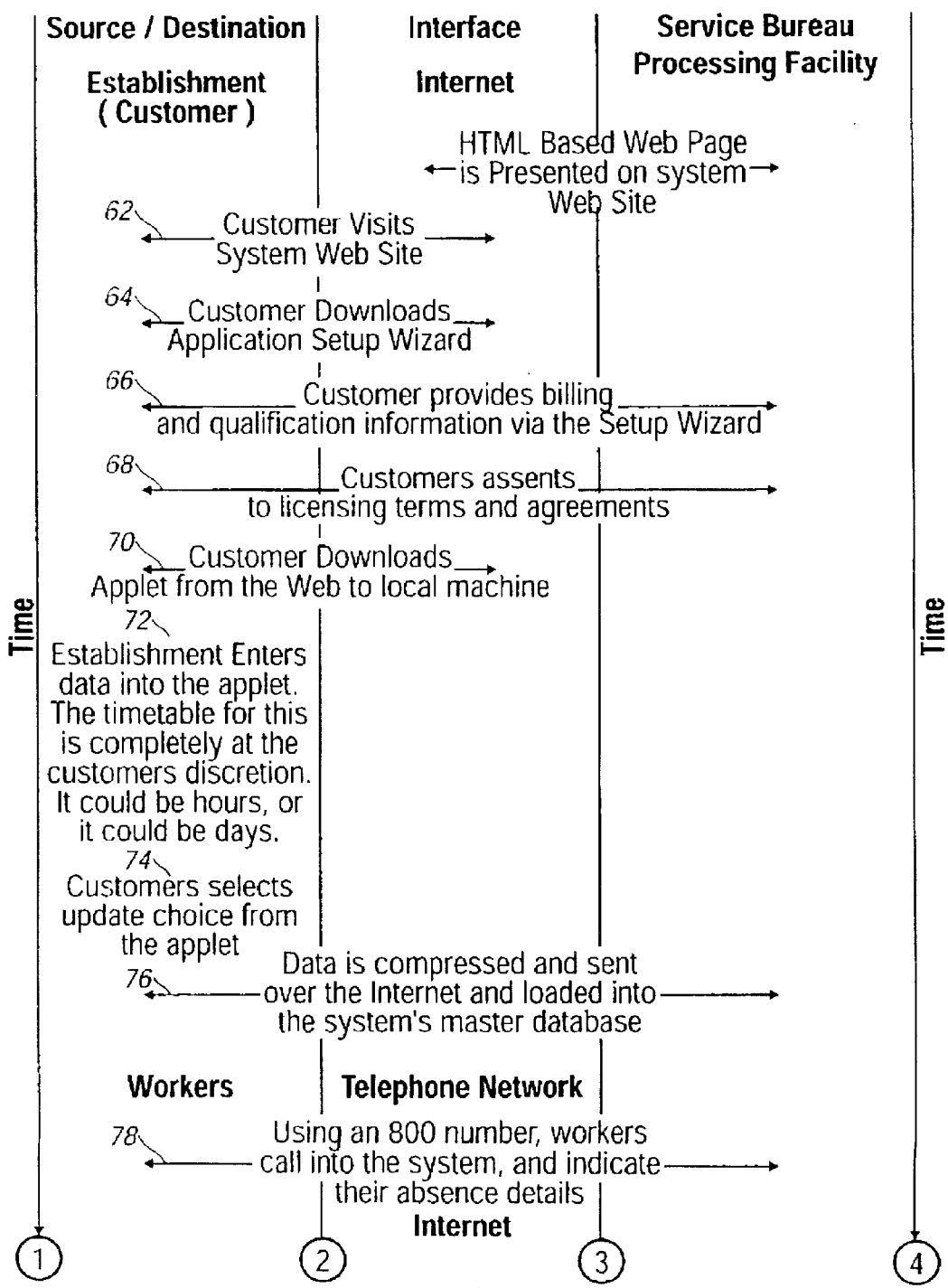
FIG. 2 is a data flow diagram showing the exchange of information between various entities involved in substitute fulfillment performed in accordance with a preferred embodiment of the present invention.

FIG. 2 illustrates the flow of information in a preferred embodiment of the present invention. Maintaining the substitute fulfillment database and performing substitute fulfillment requires a periodic exchange of information between a client organization and the system; FIG. 2 illustrates a series of these steps.

A client organization 56 is required to have a computer 54 with Internet access 12. The Internet access 12 is preferably through a direct connection, but may alternatively be through a dial-up connection. In a preferred embodiment of the present invention, a potential customer organization 56 initially accesses the substitute fulfillment system 10 through the client organization web site in step 62. In step 70, the potential customer organization 56 obtains a copy of an introductory software applet of the present invention by downloading it from the web site. Alternatively, the potential customer organization may receive a copy of the introductory software applet through a different medium, such as a CD-ROM.

In a preferred embodiment of the present invention, in step 64, once the potential customer organization accesses the web site and requests the applet, the communications and processing server first sends the organization a registration "wizard." The wizard presents a series of interfaces to guide the organization through the registration process. Referring now to FIG. 11, preferably, the registration wizard interface 250 requires that the organization submit identification 260 and billing information 258, for use primarily if the organization 56 later decides to enroll as a client with the substitute fulfillment system 10. In subsequent step 68, the substitute fulfillment system 10 next presents and requires that the potential customer organization 56 agree to licensing terms. After the information is provided in step 66, subsequently, the substitute fulfillment system 10 allows the organization 56 to download the applet to its own computer 54 in step 70.

In a preferred embodiment, until the organization 56 registers as a client organization, the organization 56 is entitled only to a trial use of the substitute fulfillment system 10 and is able to access only limited functionality of the applet and the substitute fulfillment system 10. For example, the organization 56 may only be able to use the applet to perform substitute fulfillment for a limited number of workers 18. If the organization 56 has not registered as a customer organization within a certain period, for example, 30 days, the applet expires and the organization 56 must reinitiate the process.

In a preferred embodiment, the applet resides locally on the client's computer 54 and functions independently of the main server 30 for most of its functions; an Internet connection 12 need not be maintained to run the applet, nor need Internet communications software be open. The applet is primarily a data entry and reporting and Internet communications tool. Once the organization 56 has received the applet, in step 72, the organization must enter data to initialize the applet and the substitute fulfillment system 10 for its use. In a preferred embodiment, the applet presents the client organization 56 with a series of forms to complete to build records which are key to substitute identification for each worker 18 or potential substitute 22, as well as other records necessary for ancillary tasks. Examples of other records include general customer information and reporting preferences. The applet is preferably tailored to collect data needed to perform substitute fulfillment in the work environment of the organization. For example, if the customer is a school, the applet may be tailored to collect data related to teachers, such as education background, certifications, schedules, and course information. The forms preferably conform to the data records that will be maintained by the communications and processing server 30 in the database 34. The applet may aid the client 56 in completing particular fields in the forms by providing drop-down lists with options for that field. There is shown in FIG. 5 a sample data structure 150 of a list of possible pick-lists that the applet may generate. For example, a drop-down list may provide a list of all courses taught at the school so that the client can select the classes taught by a particular teacher to fill in that teacher's record. The applet may also fill in certain fields for the client 56 automatically by drawing on information stored in other records. For example, referring to FIGS. 3 and 6, once a school has completed a school data record 166, the applet may fill in the school contact information 176, 178, and 180 for each teacher affiliated with a particular school.

When the initial data entry is complete, in step 74, the customer instructs the applet to transmit the data to the communications and processing server 30 to initialize the system 10. The applet communicates with the communications and processing server 30 via the Internet. The applet preferably transmits and receives data in compressed format. Subsequently, in step 88, the applet routinely transmits updates of data stored in servers 34, 36 to the communications and processing server 10 on a schedule determined by the client 56 in step 74 and also when expressly directed to do so by the client 56 in step 74.

Once the communications and processing server 30 has been initialized with an organization's information, the information can subsequently be updated using the applet. New information is entered in client's database using the applet. When the applet communicates with the communications and processing server 30, the communications and processing server 30 automatically determines what information has been added or changed in the client's database since the last session and updates the same information in the central database 34. Thus, all information entered into the applet resides on both the organization's computer 54 and in the substitute fulfillment database 34. Similarly, when the applet communicates with the communicating and processing server 30, the server 30 updates the applet regarding any activity that has occurred since the last communications session.

Figure 3:
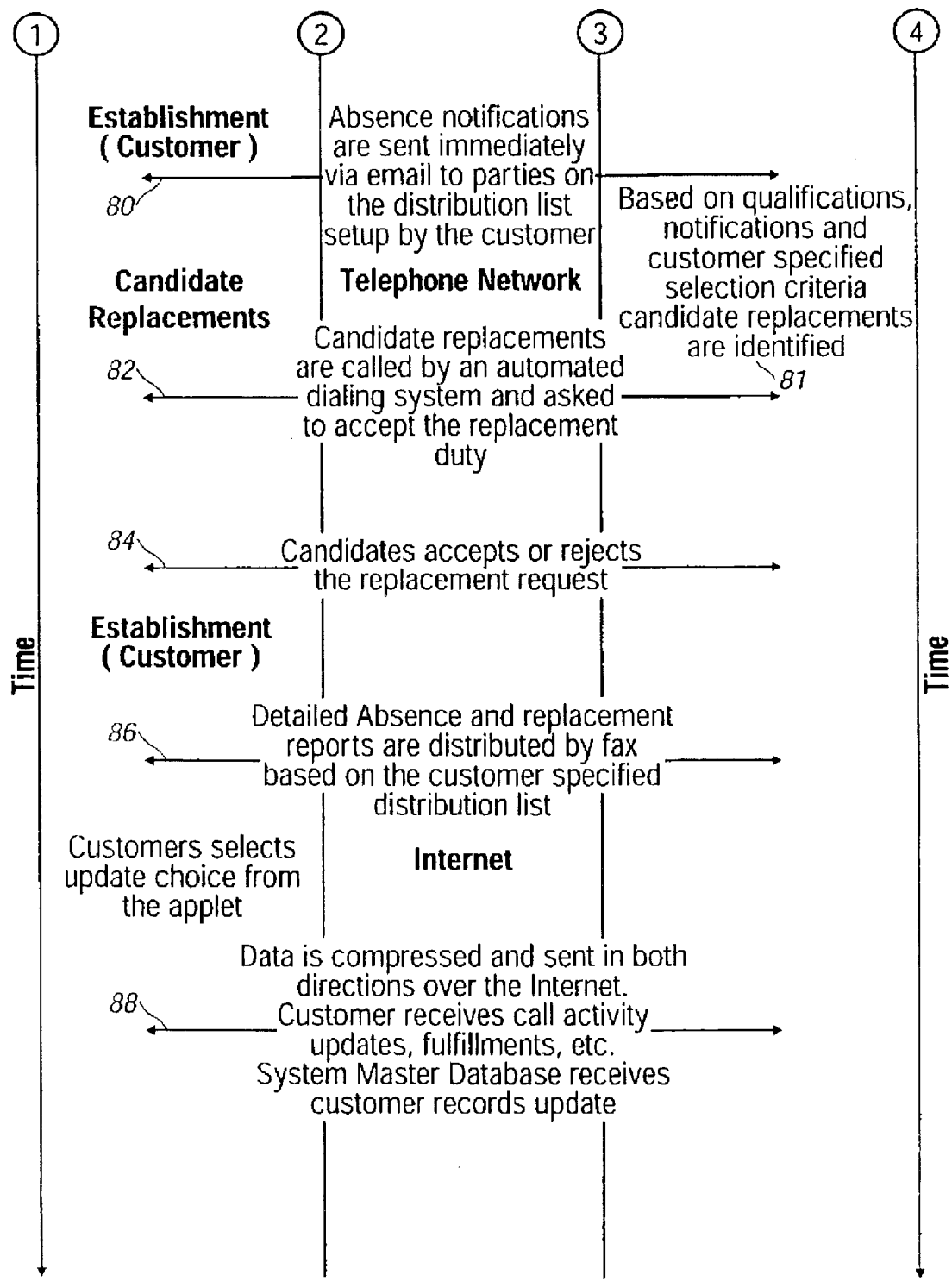
FIG. 3 is a diagram showing an exemplary data structure of a worker record stored in accordance with a preferred embodiment of the present invention.

FIGS. 3–10 illustrate a few types of data records that may be maintained and utilized in the substitute fulfillment database, particularly for a client that is a school. The data records provided illustrate what types of information the substitute fulfillment system 10 requires and how that information would typically be organized. In a preferred embodiment, the information in the data records is provided to the substitute fulfillment system 10 through the applet. Referring now to FIG. 3, teacher and substitute information stored in a staff data record 90 may include: name 92; title 94; social security number 96; a personal identification number (PIN) 98; billing information for billing substitute fulfillment services involving that teacher 100; certifications of the teacher 102; a list of teachers preferred to substitute for the teacher, or, alternatively, a list of criteria for selecting an appropriate substitute for the teacher 104; schedule information, preferably through a pop-up calendar 106, including work duties and absence information 108 (primarily for teachers) and availability 126 (primarily for substitutes); flags for special conditions 122, such as special instructions for a substitute or messages from a teacher to a substitute; affiliation information 112; contact information for the teacher 116; organization contact information for who to contact if that teacher calls in an absence or a substitute fulfillment is performed 118; classroom location information 120; entitlement balances 124, for how many absences (sick days, personal days, etc.) a teacher has left for the school year; and call time preferences 128 (primarily for substitutes). Referring now to FIG. 4, for record-keeping, billing, and administrative functions, the database may store a business data record 130 with fields such as: the billing address 132 of the customer organization, its mailing address 134, billing contact 136, emergency contacts 138, phone numbers 140, fax numbers 142, electronic mail addresses 144, and options selected 148. It is understood that the fields shown are only representative of the fields that may be used within the scope of the present invention. Also, these fields may be further broken down into more specific subfields, for example, multiple mailing addresses or different emergency contacts for different times of day, week, month, or year. In this way, the substitute fulfillment system 10 maintains the information needed to perform substitute fulfillment for a particular organization 56. Other possible records are shown in FIGS. 5–10, and include records for pick-list management 150; for school data 166; for county data 190; for district data 202; for client preferences 226; and for reporting schemes 230. The records maintained in the main database of the system 10 are preferably stored on the Oracle™ server 34.

Once the substitute fulfillment system 10 has been initialized, the system is ready to operate. No further specialized equipment need be set up at the local organization level. The substitute fulfillment operation is initiated when the system 10 identifies and schedules an absence in step 78. In the preferred embodiment of the present invention, the system may be notified of an absence in several ways in step 78. When a worker 18, 46 covered by the substitute fulfillment system 10 becomes aware of an absence, the worker 18, 46 may contact the communications and processing server 30 by telephone 48, preferably through a toll-free number. Using keys on the standard telephone keypad, the worker 18, 46 identifies himself and enters the details of his pending absence. Alternatively, the worker 18, 46 may contact the communications and processing server 30 via the Internet 26, possibly using a home-based computer 20, through a worker web site which is preferably secure. In addition to providing information regarding his upcoming absence, the worker 18, 46 may also record or transmit a message directed to the substitute 22. In one embodiment, if the worker 18, 46 notifies the organization 56, rather than the system 10, of the absence directly, the organization 56 may simply update its applet and connect to the communications and processing server 30, which process will automatically update the communications and processing server database 34, notify the substitute fulfillment system 10 of the absence, and trigger the substitute fulfillment process.

In step 80, the substitute fulfillment system 10 distributes absence notifications to relevant client personnel 14, 50, preferably on a regular basis at a time specified in advance by the client 56. Referring now to FIG. 12, notifications may take the form of summary absence reports 276. For example, the server 30 may transmit a summary absence report 276 for each work day at 5:00 p.m. on the previous day and again at 7:00 a.m. that day to selected client personnel. Summary absence reports 276 may be distributed by facsimile 52, electronic mail 16, or via the applet to any parties designated by the client 56 as "need-to-know" parties 14, 50 for all absences or for particular absences. Notification preferences are stored within the communications and processing server 30. In a preferred embodiment, designated client personnel 14, 50 receive both an absence notification via electronic mail 16 as soon as the absence is registered and a summary absence report 276 via facsimile 52 at a pre-set time. Use of multiple communications channels builds additional reliability into the system 10.

In step 81, the substitute fulfillment system 10 identifies potential replacements 22 for the absent worker 18, 46. The organization 56 typically has a pool of potential replacements 22 available to it. If the organization 56 has chosen to identify particular replacements 22 suitable for a particular worker 18, 46, then the substitute fulfillment system 10 may simply locate that list. Alternatively, if the organization 56 has identified only qualifications or criteria for selecting an acceptable replacement 22 for a particular worker 18, 46, then the substitute fulfillment system 10 may compile a list by searching for potential replacements with the requisite qualifications in a master list of replacements 22 available to the organization located in the database 34. In a preferred embodiment, the substitute fulfillment system 10 may compile a list of preferred replacements and a back-up list of acceptable replacements.

In step 82, the server 30 then contacts potential replacements 22, preferably via telephone 32, 40, 42 and 44, using interactive voice response technology that interfaces logically with callers, usually employing a set of pre-recorded prompts, a database, and dynamic selection criteria. Suitable equipment includes Dialogic™ Model D-41ESC and D-240 product lines. The substitute fulfillment system 10 will call qualified replacements 22 over a period of time until one of the qualified replacements accepts the substitute assignment in step 84 or the list of potential replacements 22 is exhausted. If multiple lists of potential replacements have been compiled, the substitute fulfillment system 10 will first search the list of preferred replacements before resorting to secondary lists. The client organization 56 may specify appropriate call times and other parameters for the Interactive Voice Response technology.

If a substitute 22 accepts the assignment, the server 30 may relay instructions from the organization 56 or messages from the absent worker 18 to the substitute. Referring now to FIG. 12, the substitute fulfillment system 10 then generates summary absentee reports 276, summary substitute assignment reports 278, call history reports 279, and unfulfilled substitute assignment reports 280 with the details of any successful replacement, all calls made, and information regarding any vacancy that could not be filled. In step 86, the server 30 distributes to organization personnel 14 designated for receipt of the reports. Clients 56 may specify different personnel distribution lists for various reports. Reports may be mailed electronically or faxed, or both by server 30.

Because the applet is updated each time the communications and processing server 30 is accessed, the applet will typically contain an accurate history of system use and may also be used for local reporting and review of historic substitute fulfillment system operation data. In a preferred embodiment of the present invention, all desired transaction information, including all absence notifications, substitute requirements, substitute fulfillment attempts, substitute fulfillment successes and failures, web site accesses, employment searches by substitutes, etc., are stored in the database 34.

In a preferred embodiment, using the information in the database 34, the server 30 may also generate a listing of opportunities for replacement workers 22 and make the listing available through a web site interface. Replacement workers 22 may access the site and select an assignment. If the same assignment is currently being processed or waiting to be processed by the substitute fulfillment system's Interactive Voice Technology, then the assignment selection is recognized, further processing is halted, and appropriate reports generated.

The server 30 is capable of handling multiple clients 56 and multiple substitute fulfillment tasks simultaneously. Because the substitute fulfillment system 10 is centralized, services multiple customers 56, and maintains a database 34, including historical system use information, the substitute fulfillment system 10 of the present invention provides special opportunities to match substitutes across organizations 56, to aggregate data and to review trends. In a preferred embodiment, the server 30 and database 34 track substitute fulfillment data globally, identify opportunities for inter-organization substitute referral or fulfillment, and report on substitute fulfillment needs and other trends. For example, the server 30 may identify substitute teachers registered in a district adjacent to a customer school district and inform the customer school district. In another example, the substitute fulfillment system may identify hot spots where substitutes with particular qualifications are in demand.

In a preferred embodiment, the substitute fulfillment system 10 has at least one offsite operational backup site. The communications and processing server and related equipment may also be supplied with a fossil-fuel powered generator for a back-up power supply.

If not otherwise stated herein, it may be assumed that all components, modes of communication, and/or processes described heretofore may, if appropriate, be considered to be interchangeable with similar components, modes of communication, and/or processes disclosed elsewhere in the specification, unless an express indication is made to the contrary.

Although the invention has been described in detail for the purpose of illustration, it is to be understood that such detail is solely for that purpose and that numerous modifications, alterations and changes can be made therein by those skilled in the art without departing from the spirit and scope of the invention except as it may be limited by the claims. All changes which come within the meaning and range of equivalency of the claims are to be embraced within their scope.

What is claimed is:

1. A computer-implemented substitute fulfillment system that identifies and secures substitute workers for a plurality of different organizations comprising:

a central server that automatically processes information associated with a plurality of different unaffiliated organizations;

a central database coupled to the central server, the central database including worker records that store substitute fulfillment data associated with each of the plurality of different organizations, wherein for each of the different organizations the fulfillment data includes worker records representing workers that may be absent from the organization and substitute worker records representing substitute workers that may be used to fill the position of absent workers;

a plurality of local processors that are remote from the central server, each of the local processors being associated with one of the different organizations and having a separate local database coupled thereto, wherein each local database is associated with one of the different organizations and includes worker records representing workers that may be absent from the organization and substitute worker records representing substitute workers that may be used to fill a position of an absent worker;

wherein the central database maintains each of the records on each local database in parallel with a corresponding record on the central database by periodically updating the records on the local databases in response to data changes on the central database, and wherein each local database maintains records on the central database, and wherein each local database maintains records on the central database in parallel with corresponding records on the local database by periodically updating the records on the central database in response to data changes on the local database;

at least one communication link coupled to the central server, wherein the communication link provides information representing absent workers to the central server;

wherein the central server automatically generates a list of one or more substitute workers for each absent worker in response to the information representing absent workers, the central server automatically communicates information representing positions to be filled to substitute workers identified by the central server via a telephone communication link or an internet communication link, the central server contacting the identified substitute workers in each list until one of the substitute workers in each list agrees to cover for the absent worker or until each list of substitute workers is exhausted; and wherein the central server periodically transmits reports that include absentee and substitute information to each of the different organizations via the telephone communication link or the internet communication link.

2. The substitute fulfillment system of claim 1, wherein each worker record includes worker identification, contact, position, qualification, and substitute selection information.

3. The substitute fulfillment system of claim 2, wherein said each worker record further includes entitlement information and historical information of absences and substitute fulfillment events.

4. The substitute fulfillment system of claim 1, wherein each substitute worker record includes substitute worker identification, contact, qualification and availability information.

5. The substitute fulfillment system of claim 1, wherein said communication link includes a plurality of phone lines that may be accessed simultaneously by a plurality of organizations and workers.

6. The substitute fulfillment system of claim 1, wherein the Internet communication link further comprises a web site interface.

7. The substitute fulfillment system of claim 1, wherein said telephone communication link further comprises means for sending facsimile transmissions from the central server to an organization.

8. The substitute fulfillment system of claim 1, further comprising interactive voice response technology, coupled to the communication link.

9. The substitute fulfillment system of claim 1, further comprising an automated telephone attendant accessible through said communication link.

10. The substitute fulfillment system of claim 1, wherein said central database further comprises a plurality of organization master records including identification, billing and contact information.

11. The substitute fulfillment system of claim 7, wherein said web site interface includes a link to a downloadable substitute fulfillment data entry and electronic communications computer application.

* * * * *